United States Patent
Pratt, Jr.

[15] 3,676,795
[45] July 11, 1972

[54] MULTIPLE-FREQUENCY LASER APPARATUS AND METHOD

[72] Inventor: George W. Pratt, Jr., Wayland, Mass.
[73] Assignee: Massachusetts Institute of Technology, Cambridge, Mass.
[22] Filed: July 13, 1970
[21] Appl. No.: 54,459

Related U.S. Application Data

[63] Continuation-in-part of Ser. No. 684,155, Nov. 20, 1967, abandoned.

[52] U.S. Cl. ..........................331/94.5, 250/199, 317/234 R
[51] Int. Cl. ..........................................................H01s 3/18
[58] Field of Search..........331/94.5; 250/199, 211 J, 217 SS; 313/108 D; 317/235 N; 332/7.51

[56] References Cited

UNITED STATES PATENTS 3,482,189  12/1969  Fenner...................................332/7.51
3,530,400  9/1970  Pratt, Jr. et al........................331/94.5

OTHER PUBLICATIONS

Pratt et al., and Calowa et al., Bull. Amer. Phys. Soc., Vol. 10, Jan. 1965, pg. 84.

Primary Examiner—Ronald L. Wibert
Assistant Examiner—Edward S. Bauer
Attorney—Thomas Cooch, Martin M. Santa and Robert Shaw

[57] ABSTRACT

Apparatus for providing a multiple-frequency laser beam wherein a multi-valley semiconductor device, having an optical resonant cavity or forming at least a part of an optical resonant cavity is pumped and a shear stress or uniaxial stress exerted upon the device to produce different-valued energy gaps within the semiconductor material.

The invention herein described was made in the course of contracts with the Office of the Secretary of Defense, Advanced Research Projects Agency.

28 Claims, 20 Drawing Figures

FIG. 9

Patented July 11, 1972 3,676,795

20 Kv or More ELECTRON BEAM

INVENTOR:
GEORGE W. PRATT, JR.
BY
ATTORNEY

INVENTOR
GEORGE W PRATT, JR
BY
ATTORNEY

INVENTOR
GEORGE W. PRATT, JR
BY
ATTORNEY

INVENTOR.
GEORGE W. PRATT, JR.
BY
ATTORNEY

MULTIPLE-FREQUENCY LASER APPARATUS AND METHOD

This is a continuation-in-part of application Ser. No. 684,155, filed Nov. 20, 1967 now abandoned.

In an application for Letters Patent entitled Acoustically Modulated Laser, Ser. No. 576,094, filed August 30, 1966 now U.S. Pat. 3,530,400 in the name of the present inventor and another, there is described a device adapted to provide a laser beam which can be modulated by an acoustic signal. The device therein disclosed is described in connection with a single-frequency carrier laser beam (although the type of modulation described and claimed therein will work on the laser device herein described) since, until the present invention was made, semiconductor beams have operated from a single inverted population. If is, therefore, an object of the present invention to provide a laser adapted to operate from multiple, independent inverted populations, thereby to produce a multiple-frequency output.

Another object is to provide apparatus wherein the difference between the different frequencies of the multiple-frequency output can be changes or modulated.

Still another object is to provide apparatus wherein the sum and difference or combination frequencies of the multiple frequencies can be obtained by mixing.

A further object is to provide a novel laser communication apparatus.

Still a further object is to provide an optical flip-flop device wherein the frequency of a laser output can be changed in response to a signal.

Other and further objects will be apparent in the description to follow and will be particularly delineated in the appended claims.

Broadly, and by way of summary, the invention is embraced by a method of providing a multiple-frequency laser beam, that comprises, establishing an inverted population in the occupation of the energy levels in a multi-valley semiconductor forming at least part of an optical resonant cavity, the lattice temperature of the semiconductor being maintained at a value low enough to enable the semiconductor material to sustain at least two separate inverted electron populations, the electron energy level population associated with each valley being substantially independent of the energy level populations of the other valleys. Means is provided for applying a shear stress or uniaxial stress to the semiconductor, the stress being one that lifts the multivalley degeneracy thereby to produce different energy gaps within the semiconductor material.

The invention will now be described in connection with the accompanying drawings, in which:

FIG. 1 is a schematic representation of a laser device of the present invention;

FIGS. 2A, 2B, and 2C show, schematically, alternate means for pumping the laser, the circuit of FIG. 2A being particularly adapted for use with the device of FIG. 1;

Figure 9:
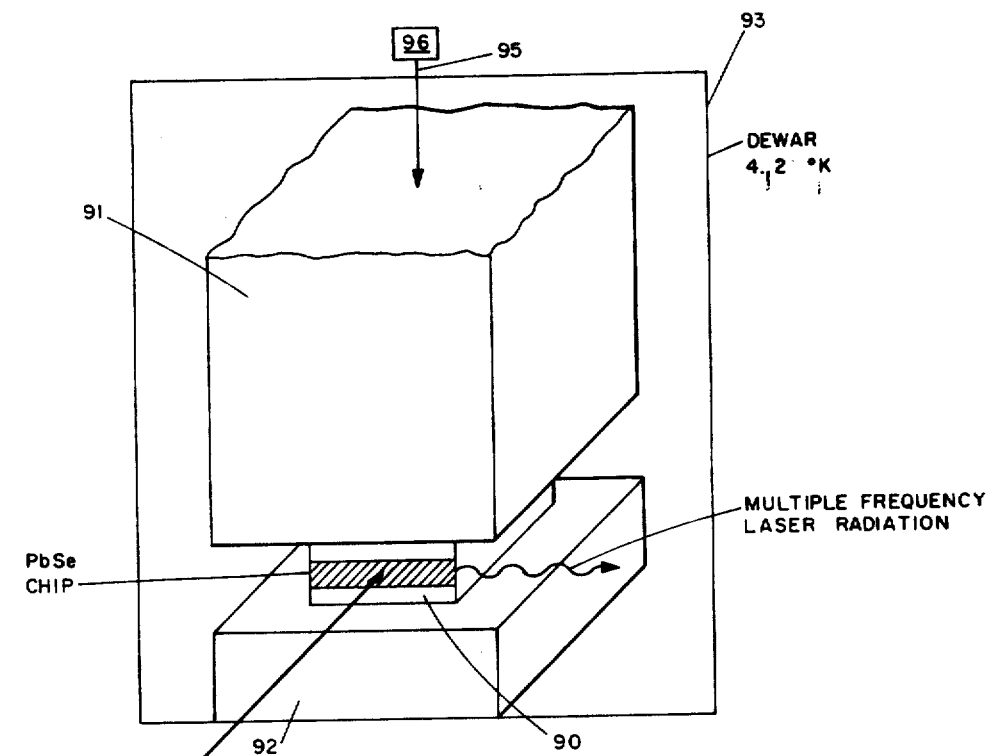
FIG. 9 is a schematic representation of a modification of the arrangement depicted in FIG. 1 and shows diagrammatically means for applying a compressive symmetry-breaking mechanical force to a multi-valley semiconductor.
Figure 14:
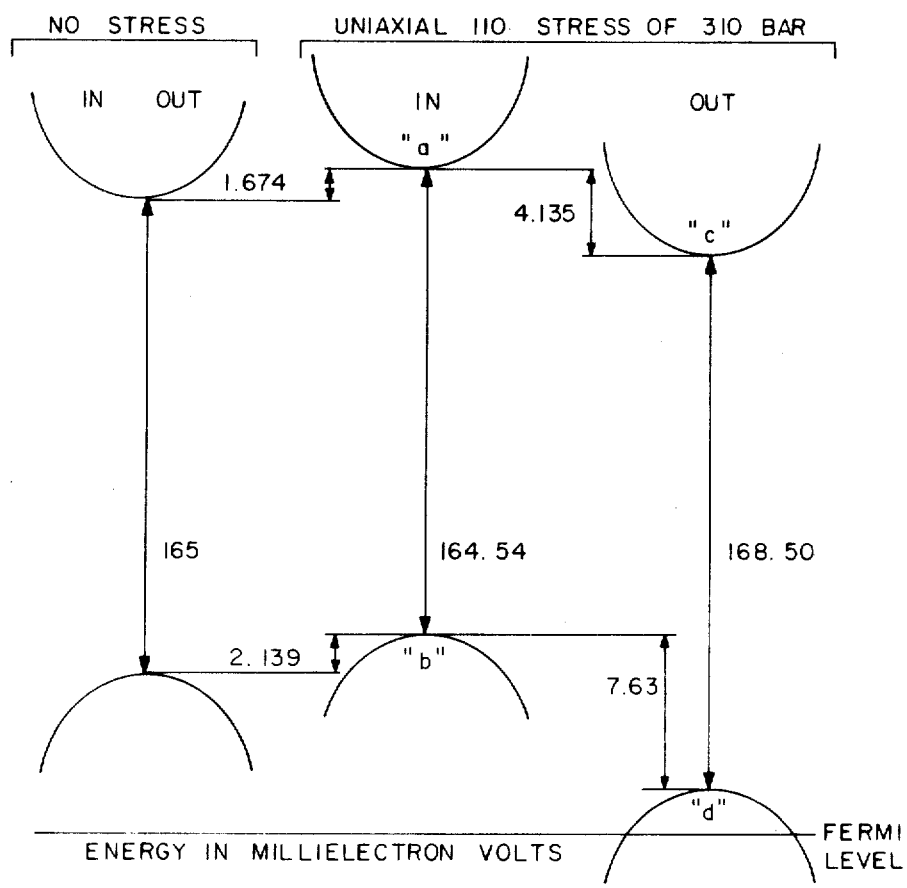
Figure 15:
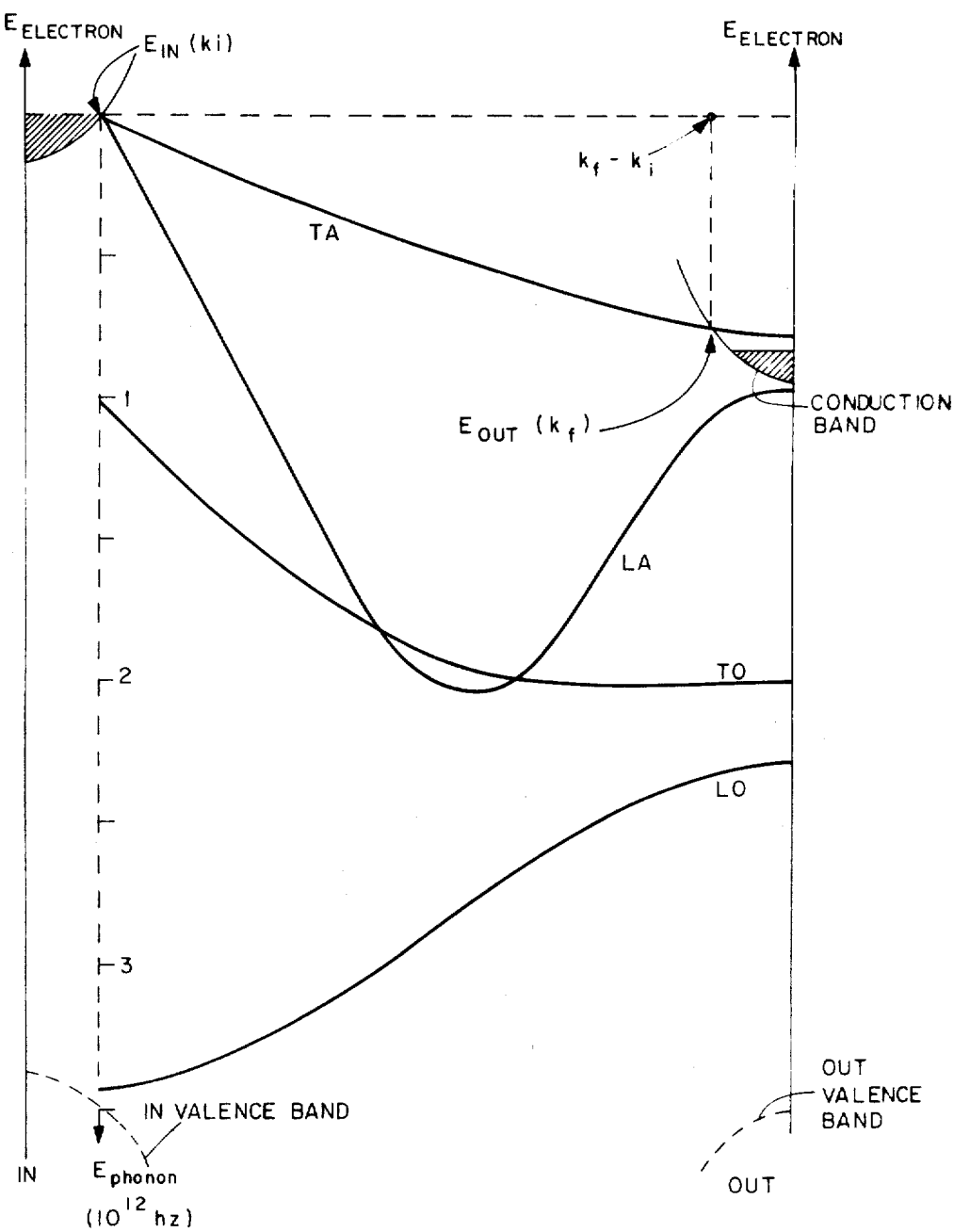

FIG. 14 shows the effect of a (1,1,0) uniaxial stress (exerted by a compression member upon a PbSe laser device in the arrangement of FIG. 9) on the valence and conduction band edges of PbSe for zero stress and a stress of 310 bars; and FIG. 15 is an energy vs. momentum diagram for PbSe showing a partially filled conduction-band valley in the upper left ($k_i$) which is filled by pumping as indicated by the shaded area and from which electrons make transitions to the empty-state at ($k_f$), the value of ($k_f$) being determined by the intersection of the phonon dispersion curve and the electron energy vs. $k$ curve for the right-hand shaded valley shown.

Figure 1:
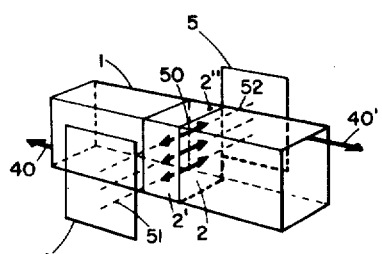
Figure 4:
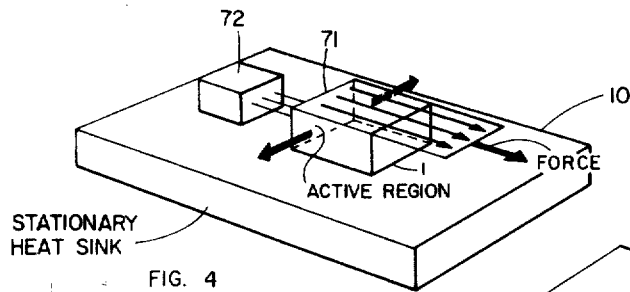
FIG. 4 is a further modification.
Figure 6:
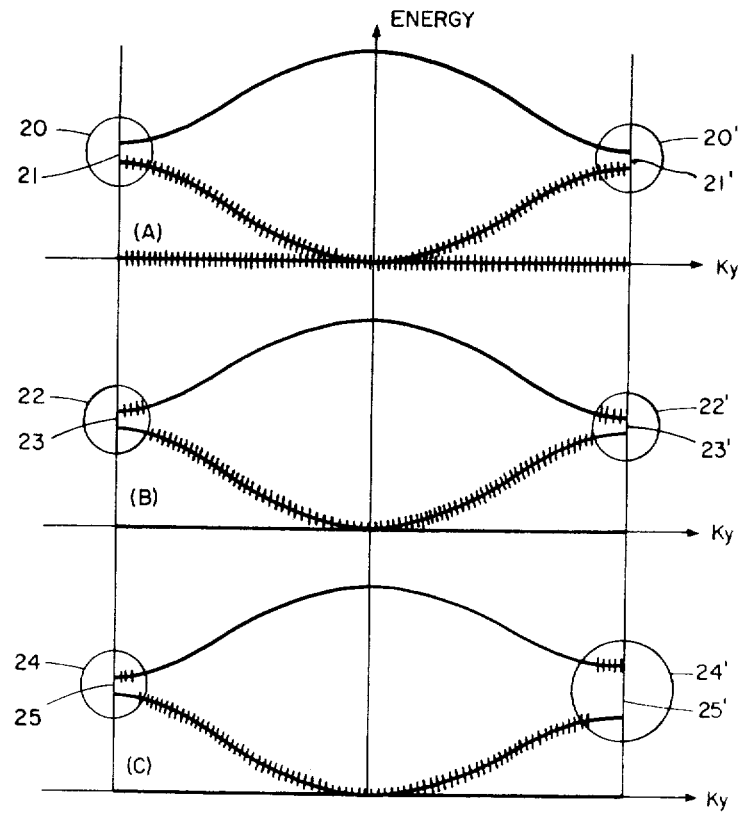
FIG. 6 is a two-dimensional diagrammatic representation of three energy conditions within a laser device, as that shown, for example, in FIG. 1, the top representation (A) showing the normal, unpumped condition, the middle representation (B) showing the pumped condition, and the bottom representation (C) showing the multiple-gap energy condition of the present invention.
Figure 7:
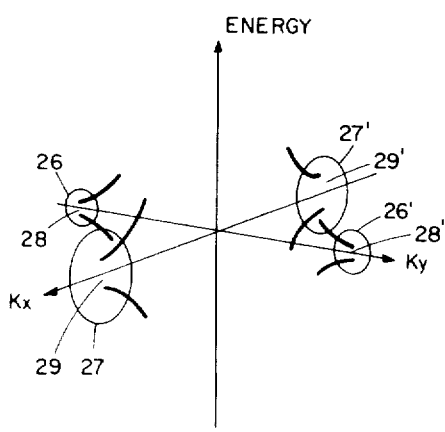
FIG. 7 is a representation similar to that shown in FIG. 6(C) except that the representation is three dimensional.

Referring now to FIG. 1 a multiple-frequency laser beam device is shown comprising a multi-valley semiconductor device 1 forming at least part of an optical resonant cavity 2 which may further include a pair of mirrors 4 and 5 hereinafter discussed. The valleys refer to the circled regions shown at 20—20', 22—22', and 24—24' in FIG. 6 and 26—26', 27—27' in FIG. 7, the electron energy gaps within the circles being shown respectively at 21—21', 23—23', 25—25', 28—28', and 29—29'. An inverted population in the occupation of the electronic energy levels of the semiconductor, as represented diagramatically in FIGS. 6(B), 6(C), and FIG. 7, may be effected by the arrangement shown in FIG. 2A. The inverted electron population or negative temperature can be achieved by operating the semiconductor 1 as a diode, the active region 2 being a part of or adjacent to the junction between the P and N portions of the semiconductor, shown respectively at 7 and 8. The lattice temperature of the semiconductor 1 is reduced to and maintained at a low value by placing the device in a dewar, as that shown schematically at 6 in FIG. 5 (a dewar is shown in greater detail in said application), or by securing the semiconductor to a heat sink 10 in FIGS. 3 and 4 and placing the complete unit in a dewar. The lattice temperature of the semiconductor must be reduced to a value low enough to enable the semiconductor material to sustain at least two separate noncommunicating or substantially non-communicating inverted electron populations, so that the electron energy level associated with each valley, as the valley 24, is entirely or substantially entirely independent of the energy level populations of the other valleys, as the valley 24'. If the population of the electron energy levels is changed by pumping from the normal or unexcited population of the electron energy levels represented by FIG. 6A to the negative temperature or inverted population condition depicted by FIG. 6B and a symmetry-breaking strain, as by the use of the schematically represented forces 40 and 40', is applied to the semiconductor 1, the multi-valley degeneracy of FIG. 6A is lifted, resulting in the different-valued energy gaps shown at 25 and 25'. (Note also that the gaps 28 and 28' differ in value from the gaps 29 and 29'). As previously noted, however, for the condition in FIG. 6C and FIG. 7 to exist, it is necessary that the lattice temperature of the semiconductor be low enough so that little or no interaction of the populations between different valleys takes place. Conservation of energy and momentum will prevent direct contact between valley populations if the applied strain is not too large and the energy difference between the various conduction band edges or valence band edges does not exceed the energy of the proper phonon required for an electron or hole to make an energy conserving transition to another band edge, as hereinafter discussed. The energy gaps 21,21',23,23',etc., are "direct" gaps as contrasted to "indirect" gaps which occur where conduction and valence band minima and maxima respectively occur at different locations in K-space.

In the embodiment of FIG. 1, a pair of reflective faces 2' and 2'', in parallel planes and optically flat, reflect the internal light energy, represented by the arrows 50, back and forth within the cavity 2 to render the cavity resonant. The faces 2' and 2'' may be assisted by the pair of mirrors 4 and 5 which may serve also to modify the reflected energy, shown being emitted from the cavity 2 at 51 and 52 in a direction orthogonal to shear stress directional forces 40 and 40'. In the latter event the optical resonant cavity will comprise the cavity 2 plus the further region between the mirrors 4, 5. Emission of the laser beam from the optical cavity is effected by having an aperture or window in the reflection surface, as is well known. Furthermore, the faces 2', 2'' may be non-reflective, in which event all the required reflection will be done by the mirrors, thus allowing forces to be exerted upon the vertical edges of the semiconductor, in addition to the forces shown, and up to four different-valued gaps can thereby be made to exist within the crystal 1 by the resulting strain. The crystal 1 may be, for example, lead telluride (PbTe) with an excess of lead producing the N region 8 in FIG. 2A and an excess of tellurium producing the P region 7, the transition region therebetween being the active region within which lasing takes place. Other multi-valley crystals such as lead sulphide (PbS) or lead selenide (PbSe) may be used.

Figure 5:
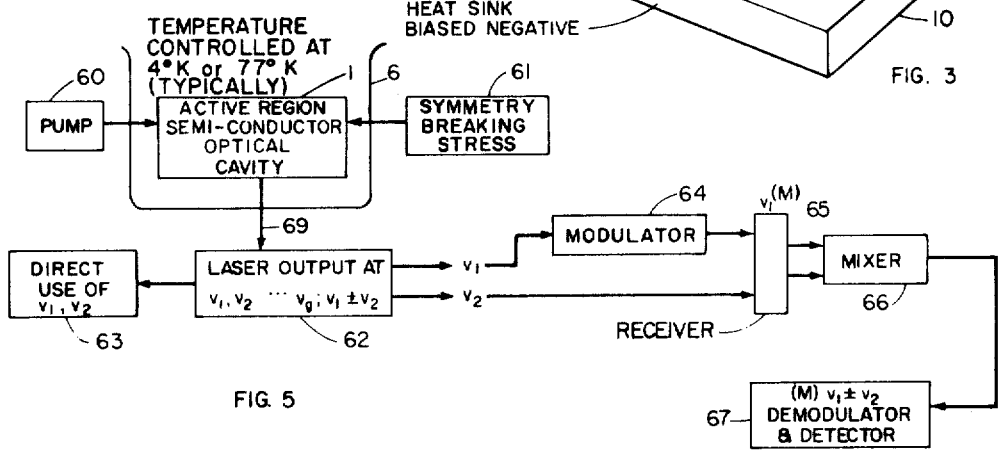
FIG. 5 is a representation, in block diagram form, of a communication system embodying the present inventive concept.

Referring now to FIG. 5, assume that a semiconductor 1 is caused to lase by appropriate energy from a pump 60. A symmetry-breaking stress may be produced by exerting a force from a piezo-electric crystal 61 or other well-known mechanical devices, as before discussed, so that a multiple-frequency beam 69 will be emitted. The frequency output may be, for example, $\nu_1$ and $\nu_2$ which are determined by the different-valued direct energy gaps within the crystal, but the beam will contain sum and difference frequencies $\nu_1 \pm \nu_2$ or other combination frequencies $n\nu_1 + m\nu_2$, where $n$ and $m$ are integers, all of which are fed to a frequency selector 62. The output from the frequency selector 62 may be passed to a wave guide 63 for direct use or it may be transmitted to some remote region. Assume that the outputs of the frequency selector 62 are $\nu_1$ and $\nu_2$ and are transmitted, as shown, and that $\nu_1$ alone is modulated by a modulator 64 (which may be a KDP crystal or Kerr cell), the modulated signal $\nu_1^{(M)}$ being transmitted together with the unmodulated frequency $\nu_2$. The signals may be picked up at the remote region by a receiver 65 and then mixed by a mixer 66 (which may be a photomixing surface) and the sum and difference or combination frequencies thereof, $\nu_1^{(M)} \pm \nu_2$ passed to a demodulator and detector 67 where the signal inserted by the modulator 64 can be removed. The frequencies $\nu_1$ and $\nu_2$ may be too high for use in connection with ordinarily available demodulator devices, but the difference or combination frequency, $n\nu_1 + m\nu_2$, may be in the microwave region and thus useful in available apparatus. Furthermore, since any shifts in the lasing frequencies due to temperature changes and the like will affect both $\nu_1$ and $\nu_2$ equally, the difference frequency is not affected by such changes, as is the case when a frequency from another source is used to beat the lasing frequency down to some useful level. Also, the frequencies available from the present device, as the sum frequencies, permits the generation of frequencies not now available with prior art devices. Although the explanation just made relates to two frequencies $\nu_1$ and $\nu_2$ and sum and differences or combinations thereof, other frequencies are available, as previously explained, and are designated $\nu_1, \nu_2 \ldots \nu_n$ in FIG. 5. In addition the modulation of the output may be effected within the optical cavity 2 by varying the stain exerted by the force exerting means 61 in direction, magnitude and/or time, and one or more of the output frequencies can be thus affected.

Figure 2A:
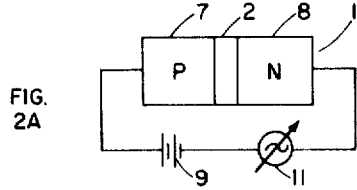
Figure 2B:
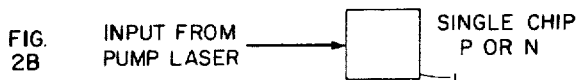
Figure 2C:
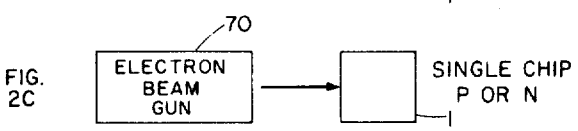
Figure 3:
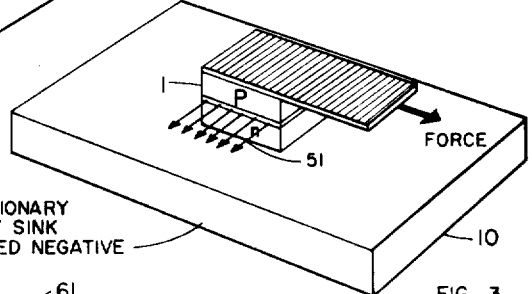
FIG. 3 is a modification of the device of FIG. 1.

In the previous discussion, the pumping was done by the circuit arrangement shown in FIG. 2A, a battery 9 supplying the power. It is possible to pump, also, using the arrangement shown in FIGS. 2B and 4 wherein another laser (as the laser shown at 72 in FIG. 4) serves the pump function or by the use of an electron gun 70, as shown in block diagram form in FIG. 2C, which requires an electron beam of, for example, 20 Kv. Optical pumping, as particularly shown in FIG. 4, produces lasing at the exposed face of a single-P or N crystal in the form of a surface strip 71 extending orthogonal to the pump beam very near to the surface of the crystal.

The multiple-frequency laser described herein may be made to operate in a double frequency mode as an optical flip-flop in a manner now to be discussed.

If the symmetry breaking stress is of sufficient magnitude, the energy separation of the stress split conduction and/or valence band valleys will be large enough so that carriers can transfer from a high lying valley, as 24', to a lower lying valley, as 24, by emission of a phonon and conservation of energy and momentum. Under these circumstances, the population of the valleys loses its non-communicating character and the lasing action associated with the higher lying valley ceases. Thus, increasing the applied stress beyond a certain critical value can cause one or more of the lasing processes to cease. Decreasing the applied stress permits the reappearance of this process. The stress required for this may be applied by mechanical or piezo-electric means, as before discussed. In certain materials it is possible to use an applied stress to turn the laser totally off. This will occur when the applied stress produces an indirect gap material.

Another means of switching the frequency output is the application of a strong electric field to the lasing medium by the use, for example, of a source of potential 11 in FIG. 2A. This can result in a transfer of carriers from the active or lasing region by field induced drift and, thus, lead to a loss of inverted population thereby causing the laser to go below threshold. The loss may be equal for all lasing conduction-valence band valley pairs if the applied field affects them in the same way, or it may be unequal if the applied electric field is in a direction so that an anisotropy in the mobility leads to a different loss of carriers from the conduction-valence band pairs. Those valleys oriented so as to have the lowest mass in the direction of the field will experience a larger decrease in the inverted population and cease to lase first as the applied field is increased. Though illustrated only in connection with the device of FIG. 2A, the potential source 11 may also be used to provide a similar function in connection with the devices of FIGS. 2B and 2C.

The strong field will also raise the effective temperature of the holes in the valence band and electrons in the conduction band so that the inverted population between bands decreases to below the threshold value. Furthermore, at some value of field there will be induced an electric breakdown in the lasing medium thereby destroying the lasing condition and shutting off the laser. In addition the strong field may transfer carriers from lower lying conduction and/or valence band valleys to high lying valleys as in the transferred electron model of the Gunn effect proposed by Ridley and Wilkins. (Proc. Phys. Soc. (London) 78, 293, 1961). This transfer of electrons to or from valleys which are participating in or could participate in a lasing process can be used to turn on or off one or the other or both frequencies and in this fashion effect very rapid switching between lasing frequencies.

Figure 10A:
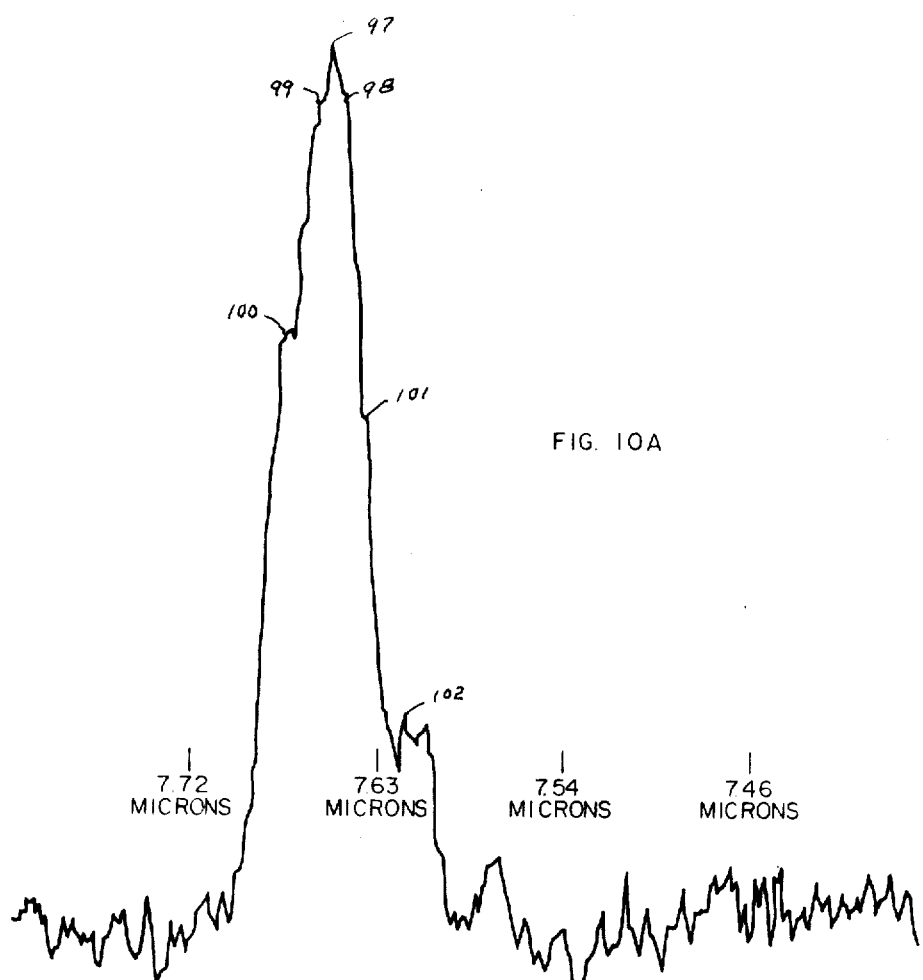
FIG. 10A is a reproduction of a recorder trace of a PbSe laser emission with no stress upon the device and showing a center of the distribution at 7.65 microns or 0.162 ev.
Figure 10B:
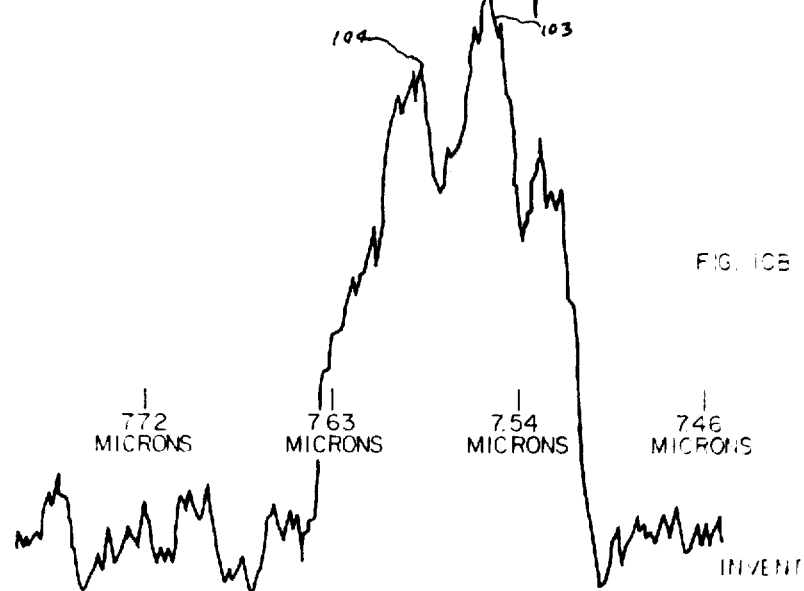
FIG. 10B is a trace similar to that of FIG. 10A except that there is applied to the PbSe laser a (1,1,0) symmetry-breaking stress of 68 bar and the center of the distribution is at 7.57 microns or 0.1636 ev.
Figure 10C:
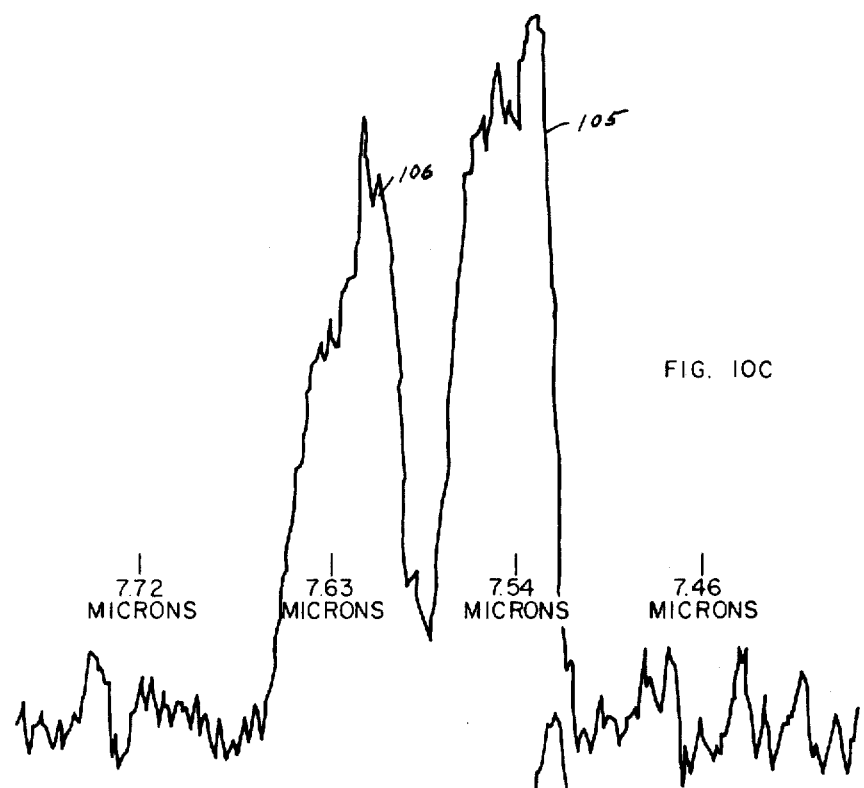
FIG. 10C is a trace similar to FIG. 10A except that there is applied to the PbSe laser a (1,1,0) symmetry-breaking stress of 99 bar and two separate frequency envelopes are shown, the lower peak of the two being at 7.61 microns or 0.1627 ev and the upper peak being at 7.55 microns or 0.1642 ev.
Figure 10D:
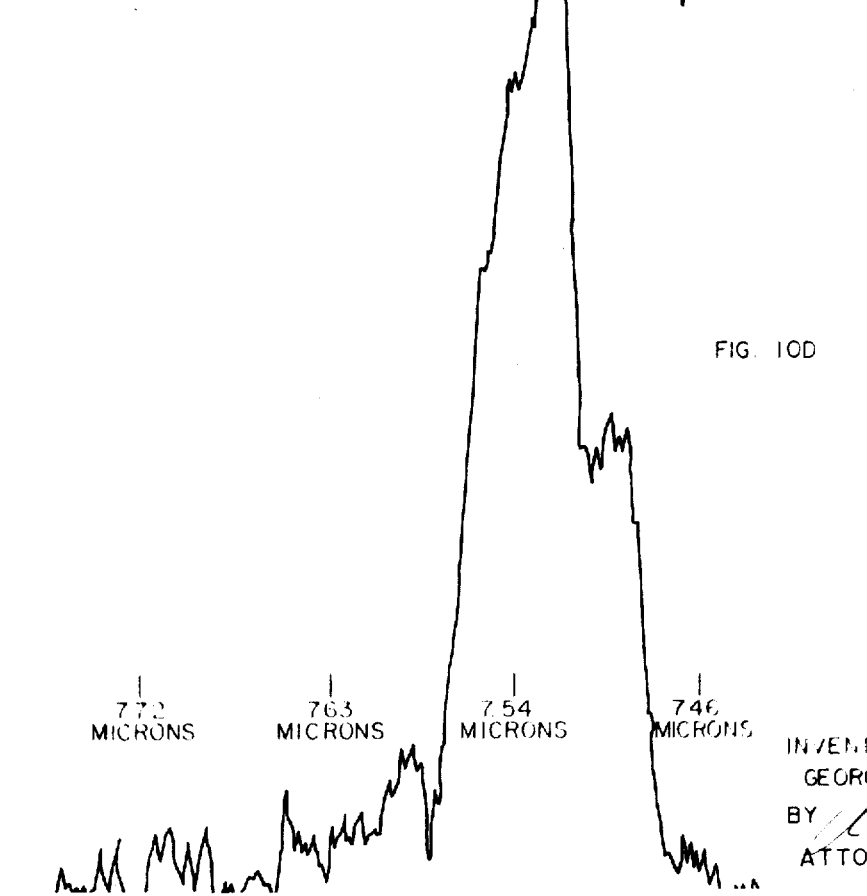
FIG. 10D is a trace similar to FIG. 10A except that there is applied to the PbSe laser a (1,1,0) symmetry-breaking stress of 124 bar and the center of distribution is at 7.52 microns or 0.1645 ev.

Referring now to FIG. 9, a P-type PbSe single crystal chip 90 is shown disposed within a dewar 93 (at 4.2° K in the device discussed in this paragraph) and placed between two copper blocks 91 and 92 which act as heat sinks to maintain the temperature at or near 4.2° K during lasing. Lasing is effected by a GaAs pump laser 94. In actual apparatus tested the PbSe chip dimensions of a chip such as the chip 90 are 100 microns × 150 microns × 300 microns, a mechanical compressive force represented by the arrow numbered 95 being exerted by a bellows 96 on the (1,1,0) plane of the chip, i.e. the normal to the plane in real space is in the (1,1,0) direction and this is also the direction of the 100 micron dimension. (The dimensions of the laser chip can be much larger. Further, it is necessary when using an optical pumping method to illuminate a sufficiently large portion of the chip so that lasing will occur.) The air pressure in the bellows was varied from 0 to 1,500 psi (i.e., 0 to 100 atmospheres), representing compressive forces on the chip from 0 to $1.5 \times 10^{-2}$ pounds. The laser frequency output from the chip 90 is shown in FIGS. 10A to 10D which are exact ink reproductions of test results made by a recorder of the output of the tested device. FIG. 10A represents a zero pressure or stress condition and shows a single envelope multimode output similar to that discussed in Butler et al. (cited in said U.S. Pat. No. 3,530,400), the single envelope being centered at 97 (about 7.65 microns) with modes at 98, 99, 100, 101 and 102, among others. In a single or uni-valley laser the transitions which are the source of the emitted radiation take place at a single place in $k$ space. The radiation may be emitted in a single mode of the laser cavity or may be emitted in several cavity modes. In a multi-valley laser the transitions which are the source of the emitted radiation take place at the multiple points in $k$ space at which the valleys are located. The radiation emitted at the multiple points in $k$ space for the unstrained multi-valley laser may be in a single mode of the laser cavity or may be emitted in several cavity modes. FIG. 10A shows a condition in which all four of the equivalent (1,1,1) gaps, hereinafter discussed in connection with FIG. 13, make essentially equal contributions to the cavity modes 97 to 102. A symmetry breaking strain has the effect of altering the contributions of radiation intensity from the several valleys to a given cavity mode. Pressure is exerted by the bellows 96 and the characteristic frequencies move to the right, as shown in FIG. 10B, dividing into envelopes 103 and 104 and finally into the two separate outputs represented by the envelopes 105 and 106 in FIG. 10C. If the symmetry-breaking stress provided by force at 95 is large enough (in this particular instance about 125 atmospheres in the 1,1,0 direction), one of the envelopes disappears, as shown in FIG. 10D. In the latter situation an energy separation occurs which will allow carriers to transfer from the upper conductive band valleys at (1,1,1) and $(1,\bar{1},\bar{1})$ to the lower conductive band valleys at $(1,\bar{1},1)$ and $(1,1,\bar{1})$, as hereinafter discussed in greater detail. The force exerted by the bellows 96 in this example does not vary with time, but the force can vary with time to cause said one envelope to disappear and appear during the course of the pressure excursions.

In the experimental work discussed in the previous paragraph, optical cavities of annealed, $10^{18}$ P-type, PbSe were prepared with two parallel (1,1,0) pressure faced typically 6 × $10^{-2}$ mm², a pair of cleaved (1,0,0) planes which acted as reflecting faces of the laser cavity, and a pair of (1,1,0) faces one of which was used as the pumping surface. The length of the cavity between reflecting (1,0,0) planes was ordinarily 0.3 mm. Consequently, the longitudinal modes are separated by about 87 GHz. A pulsed GaAs laser was used as the pumping source 94 with 100 ns pulses at a 100 cycle repetition rate. The pumping power was about 5 watts. Before the application of pressure the PbSe sample rested freely on a copper ribbon which was carefully bonded to the cold finger of a helium exchange gas dewar. A piston, which itself was thermally anchored to the cold finger, was moved up against the copper ribbon pressing the PbSe between the ribbon and cold finger. The piston was driven by a bellows, like the bellows 96, which was connected to an outside gas supply. The pressure was measured using a bourdon gauge with an accuracy of about 5 percent. The PbSe emission was focused on the entrance slit of a double pass Perkin Elmer grating monochromator whose resolution is about 50 GHz. A Au doped Ge detector was placed at the exit slit of the monochromator and the response synchronously analyzed.

FIG. 10A is a direct recorder trace of the signal with no (1,1,0) stress applied. Several modes are above threshold; however, they are not fully resolved. The peak occurs at 7.66 microns or $1.62 \times 10^{-1}$ ev. The absolute temperature is estimated to be about 30°K. FIG. 10B shows the results for an applied pressure of approximately 68 bar. The envelopes of the emission associated with the IN and OUT gaps (the terms "IN" and "OUT" are hereinafter defined) are moving apart with several modes present in each envelope shown. The center of the distribution in FIG. 10B is 7.57 microns or $1.636 \times 10^{-1}$ ev. In FIG. 10C the complete separation of the envelopes is observed at a (1,1,0) pressure of 99 bar. The lower peak is at 7.6 microns or $1.64 \times 10^{-1}$ ev. The lower energy envelope labeled 106, is due to IN valley transitions and appears here quite separate from the higher energy envelope, labeled 105, which is associated with OUT valley transitions. With further increase in pressure these two peaks move further apart. Finally, in FIG. 10D the envelope associated with the IN valley emission has disappeared completely and the OUT valley envelope roughly doubles its intensity as though it has picked up all the intensity of the missing IN valley transitions. This is believed to be due to stress induced intervalley transitions which deplete the electrons excited to the IN conduction band valleys and reduce the inverted population between IN valence and conduction bands below threshold. Experimental values for the pressure dependence of the IN gap and OUT gaps of $0.88 \times 10^{-5}$ ev./bar and $2.17 \times 10^{-5}$ ev./bar were obtained in this work. Both IN and OUT gaps increase in energy at $4 \times 10^{-4}$ ev./deg. The pressure dependence of the lines is such that a pressure change of roughly 20 atmospheres is equivalent to a 1° K change in temperature. As the bellows system is pressurized, the heat leak to the sample from the outside will increase slightly increasing the sample temperature. However, the difference between the IN-OUT valley gaps according to the data obtained agrees well with the theoretical values.

If the symmetry breaking stress is varied with time, i.e. amplitude modulated, the result will be a frequency modulation of the emission of the PbSe laser. This frequency modulation, as explained in said application, is due to the stress induced variation of the refractive index of the material. (Amplitude modulation of an applied magnetic or electric field will also result in frequency modulation of the emission.) When the applied stress is of the proper direction and magnitude, so that separate emission occurs from different sets of valleys such as in FIG. 10C, the family of cavity modes associated with the radiation due to one set of valleys (say the set whose major axes lie IN the plane containing the stress force vector) will not be coincident with the cavity modes due to the radiation associated with the second set of valleys (say the set whose major axes are OUT of the plane containing the stress force vector). In fact, one has a stress induced birefringence. Let the frequency of the modulated signal associated with the IN set of valleys be proportional to $\cos\{\omega_{IN}t + M_f \sin \omega_s t\}$ *and that associated with the OUT valleys be* $\cos\{\omega_{OUT}t + M'_f \sin \omega_s t\}$. Then upon mixing these signals, there will result a difference signal proportional to $\cos\{(\omega_{IN}-\omega_{OUT})t + (M_f-M'_f) \sin \omega_s t\}$ where $\omega_s$ is the modulating frequency, $\omega_{IN}$ and $\omega_{OUT}$ are the frequencies of modes associated with the IN and OUT sets of valleys. The frequency difference $\omega_{IN}-\omega_{OUT}$ is pressure dependent. Taking the symmetry-breaking stress to have a dc component, it is possible to fix $\omega_{IN}-\omega_{OUT}$ which would be proportional to this dc component. The ac component of the symmetry-breaking stress is the signal $\omega_s$ containing the information to be conveyed. The DC component is typically large, of the order of tens of atmospheres, as discussed, whereas the ac component referred to in this paragraph is small, typically of the order of one atmosphere. It should be kept in mind, in this connection, that any periodic forces should have a half wave length long enough to effect either compression or rarefaction of substantially the whole lasing region at one instant of time, i.e. the elastic forces should be substantially uniform throughout the lasing region.

In the discussion given above the multi-valley degeneracy was lifted by applying a symmetry breaking mechanical stress. The multivalley degeneracy can also be lifted by application of an external magnetic or electric field oriented in such a way that the effect of the field is not the same for all valleys. A combination of mechanical stress, magnetic field, and electric field can also be used.

Figure 11:
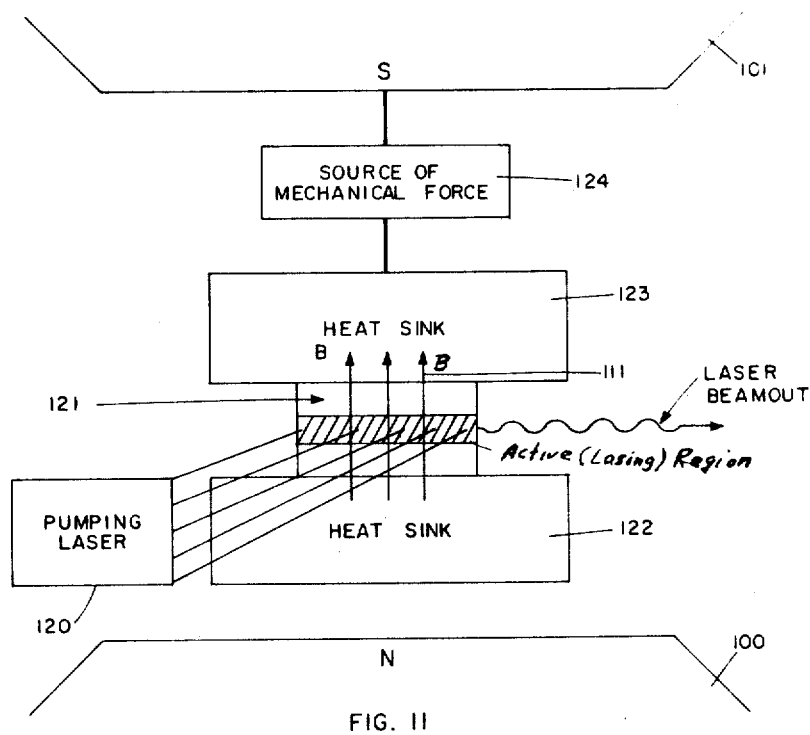
FIG. 11 is a schematic representation of a modification of the arrangement shown in FIG. 9 and shows a magnetic means for exerting symmetry-breaking stress, as well as a mechanical means.

In FIG. 11 a P-type PbSe laser chip 121 is again pumped by a GaAs laser 120 as shown. (The laser could be a PbSe diode with the P-N junction lying in a (1,1,0) plane.) The chip in this case is placed in a magnetic field oriented along the (1,1,0) direction. A magnetic background field of about 20,000 gauss in the region occupied by the laser device and oriented in (1,1,0) direction will provide the same effect as that shown in FIG. 10C. Because of the anisotropy in the g-factor of a valley and the anisotropy in the effective mass tensor of a valley, the valleys whose major axes lie IN the (1,1,0) plane are changed in energy by the applied magnetic field differently than the valleys whose major axes lie in the (1,$\bar{1}$,0) plane. The radiation emitted from states associated with the IN valleys will have a different intensity dependence on frequency than the radiation emitted from the OUT valleys. The magnetic field can be used in combination with a mechanical force and or electric field. At a sufficiently large magnetic field, depending on its orientation and the values of applied electric field and/or mechanical stress, the electrons in the highest conduction band minima will emit a phonon and make transitions to the lower conduction band minima drastically reducing the intensity of radiation associated with the upper conduction band minima and enhancing the radiation associated with the lower conduction band minima. In PbSe a magnetic field of the order of $3.2 \times 10^4$ gauss would be necessary to effect this switch in the absence of simultaneous mechanical and/or electrical forces. The magnetic field required to accomplish this switch in radiation intensity can be varied by applying a mechanical stress and/or electric field. If an N-type laser chip is used, the holes in the lower valence band maxima will switch to the higher valence band maxima with the emission of a phonon to conserve momentum when the energy difference between the lower and upper valence band maximum becomes equal to the correct momentum conserving phonon. In FIG. 11 and chip 121 is shown disposed between two heat sinks 122 and 123, the heat sink 123 being secured to a source of mechanical force 124, as before, and the whole unit being disposed in a dewar (not shown). The magnetic field as be supplied by a source of magnetic field represented by the pole pieces numbered 100 and 101, but superconductor magnetics can best serve the required function. The laser chip in FIG. 11 is PbSe oriented so that the heat sinks 122 and 123 press on the (1,1,0) planes of the crystal. A PbSe diode with the junction along a (1,1,0) plane is an alternate means of obtaining results similar to that obtained from the chip 121. In this latter situation one heat sink would contact the P-side of the chip and the other heat sink would contact the N-side thereof and lasing would occur at the P-N junction region therebetween, the orientation of any magnetic field being as shown in FIG. 11.

Figure 12:
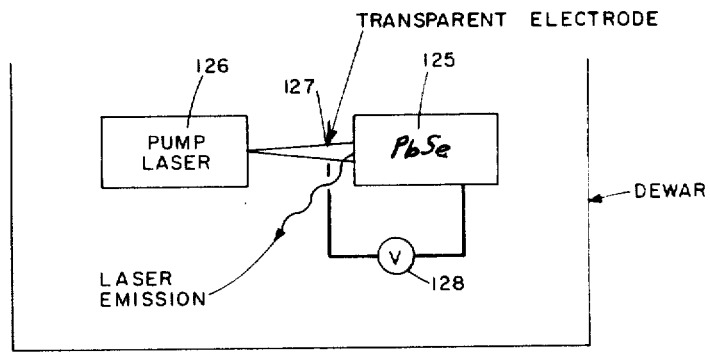
FIG. 12 is a schematic representation of a modification of the arrangement shown in FIG. 9 and shows electric means for exerting a symmetry-breaking stress.

FIG. 12 shows a P-type PbSe laser chip 125 pumped by a GaAs laser 126. The chip 125 is placed in an electric field oriented along the (1,1,0) direction. The electric field affects the band structure and optical transition probabilities of a solid. See, for example, Y. Yacoby, Phys. Rev. 140, A263 (1965) and the many references cited there. Moreover, the effect of an electric field on a particular ellipsoidal energy surface (or other constant energy surface) depends upon its orientation relative to the principal axes of the ellipsoid. Consequently, in the example given above, the IN valleys whose major axes lie in the (1,1,0) plane will be affected differently from the OUT valleys whose major axes lie in the (1,$\bar{1}$,0) plane. There will be a different intensity dependence on frequency for radiation associated with OUT valleys. At sufficiently large electric field, of the order of $10^5$ volts per cm., depending on the material and orientation of the field and on the values of simultaneously applied stress or magnetic field, the electrons in the highest conduction band minima will emit a phonon and make transitions to the lower conduction band minima drastically reducing the intensity of radiation associated with the upper conduction band minima and enhancing the radiation associated with the lower conduction band minima. The electric field could be applied in any one of several standard methods such as placing a transparent electrode 127 near the pumped surface of the PbSe chip and applying a voltage from a potential source 128 between the electrode and the PbSe chip. In the case of PbSe, it is necessary to operate at 77° K or below,thus requiring a dewar, heat sink, and standard cryogenic apparatus. Also, as explained previously herein, an external electric field can effect the transfer of electrons between valleys in a semi-conductor,as observed in the Gunn effect. Such a transfer could markedly alter the inverted population between valleys at any point in $k$-space and have the effect of enhancing or inhibiting the optical transitions occurring at that point in $k$-space.

Figure 13:
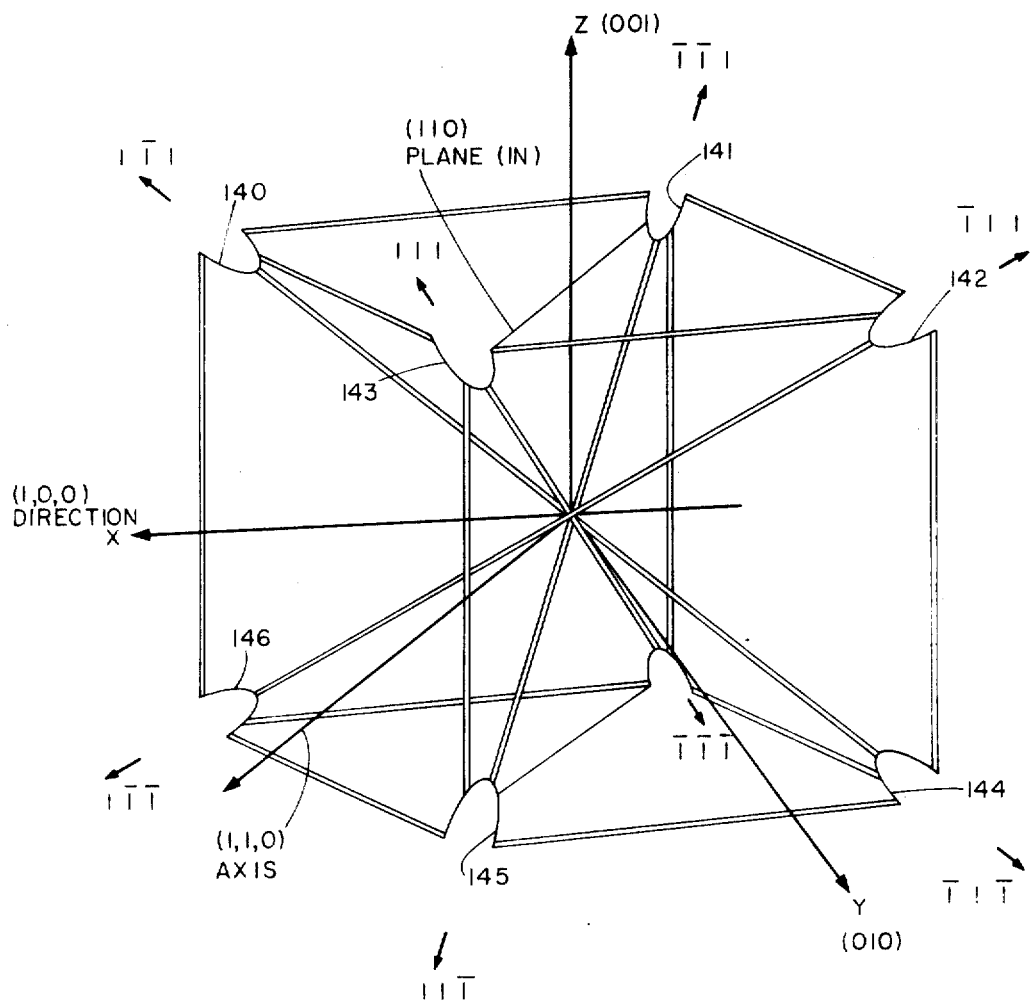
FIG. 13 illustrates in three dimensions constant energy surfaces about the valence or conduction band extrema at the L edges of the Brillouin zone.

The discussion in this and the next two paragraphs, while somewhat general in nature, relate to the PbSe crystal whose lasing output is analyzed in FIGS. 10A to 10D. PbSe is a multi-valley, direct gap, semiconductor in which the valence and conduction band valleys occur at the (1,1,1), ($\bar{1}$,1,1), (1,$\bar{1}$,1), and (1,1,$\bar{1}$) edges of the Brillouin zone. FIG. 13 shows a set of constant energy surfaces which could represent the valence band maxima or conduction band minima. Of course, there are only four independent ellipsoids since those at $\vec{k}$ and $-\vec{k}$ are related by a reciprocal lattice vector. In FIG. 13 the four ellipsoids or valleys at $\vec{k}$ are numbered 140, 141, 142 and 143 and those a -$\vec{k}$ are marked 144, 145, 146 and 147. The ellipsoid 140, 141,142 and 143 being respectively the (1,1,1), (1,$\bar{1}$,1), (1,$\bar{1}$,1) and (1,1,1) valleys and the ellipsoids 144, 145, 146 and 147 being respectively the ($\bar{1}$,$\bar{1}$,1), ($\bar{1}$,1,1), ($\bar{1}$,1,$\bar{1}$) and ($\bar{1}$,$\bar{1}$,$\bar{1}$) valleys. Further, as explained below, the valleys 141, 143, 145 and 147 are termed "IN" valleys herein and the valleys 140, 142, 144 and 146 are termed "OUT" valleys. With reference to FIG. 13, the effect of uniaxial strain, in say the (1,1,0) direction, is to break symmetry and produce different energy gaps; thus, as a result of symmetry-breaking stress, the valleys 141, 143, 145 and 147, shown to be in the (1,1,0) plane, will have one energy level and the valleys 140, 142, 144 and 146 will have another. By way of further explanation, consider P-type PbSe which is optically pumped and where the multi-valley degeneracy has been lifted. Electrons in the different conduction band minima are unable to thermalize and establish a single quasi-fermi level if the temperature is sufficiently low and the splitting of the conduction band degeneracy not too large. Intervalley transitions require the emission or absorption of a (2,0,0) phonon, as above mentioned, in order to conserve momentum. The lowest energy (2,0,0) phonon has an energy equivalent to about 50°K. Consequently, well below 50° K only phonon emission can take place. However, both energy and momentum must be conserved and phonon emission cannot occur unless the valleys differ by the energy of the emitted phonon. This corresponds to a uniaxial stress of the order of 100 bars depending, of course, on the direction of the stress. Therefore, at pressures up to this limit radiation will be emitted due to transitions originating in each conduction band valley (intervalley transition can occur due to indirect processes but they are too slow to affect stimulated emission where the optical life time of a conduction band electron is in the $10^{-11}$ to $10^{-12}$ sec. range); and the transitions that occur can provide the radiation outputs represented in FIGS. 10A to 10C.

When the stress splits the minima by more than the intervalley phonon energy, direct transitions can occur with phonon device such as GaAs will have the effect of changing the single energy gap between 84 and 85 but not producing multiple gaps. On the other hand, it has been found for present purposes, as above explained, that a stress upon a multi-valley device can destroy the symmetry and energy degeneracy between the valleys such as the valleys 20 and 20' in FIG. 6A and FIG. 8, causing a change in the respective gaps 21 and 21' to cause one lasing frequency to be emitted from one gap and another lasing frequency to be emitted from another. To distinguish between what might appropriately be called "multi-mode" emissions of the type shown and discussed in the Butler et al. reference cited in said parent application and similar-type emissions from uni-valley devices such as GaAs, the term "multi-gap" (also "different-valued energy gaps") is used herein to denote the multi-frequency (or multiple frequency), multi-mode type of function within the multi-valley device wrought by a symmetry-breaking stress and "uni-gap" is used to describe the single envelope, multi-mode type of function of a uni-valley device such as GaAs or the devices discussed in Butler et al. when operated in the manner there described. Both the multi-valley and the uni-valley devices discussed herein are direct gap materials. In the present specification, it has been assumed that transitions to provide stimulated emission for lasing in both the multi-valley devices and the single valley devices is between the conduction and valence bands; but it should be here noted that transitions in the case of GaAs quite probably occur between impurity levels. However, the explanation applies in either event.

The term strain is also well known and an explanation of the term can be found in Chapter IV, "Introduction to Solid State Physics" by C. Kittel, Second Edition, John Wiley and Sons, Inc., New York (1953). A coordinate system imbedded in an undisturbed solid is altered by the application of an external force. The change or strained coordinate system, $x_i'$ is related to the unstrained coordinate system $x_j$ by the components of the strain tensor $\epsilon_{ij}$ through the relation $$X'_i = (\sigma_{ij} + \epsilon_{ij}) x_j$$

A "symmetry-breaking strain" is a strain that leaves the crystal in such a state that the group of symmetry operations the leaves the crystal invarient, is changed. For example, a cube stretched along a direction parallel to a cube edge becomes a parallelepiped of lower symmetry than the cube, and the stress causing the strain which changes the symmetrical cube configuration to the asymmetrical parallelopiped configuration (as the stress exerted for the forces 40 and 40' in FIG. 1) is a symmetry-breaking stress causing a symmetry-breaking strain. A "shear stress" is a force applied in such a way that parallel planes in the material move in opposite directions along a line perpendicular to the normal to the planes. A mathematical explanation can be found in Kittel. The stress can be mechanical, as more particularly discussed herein in connection with FIG. 9 (See Physics by Hausman and Slack, second edition, 23rd printing, by D. Van Nostrand Company, Inc., in 1946 at pages 164–5 for discussion of mechanical stress and strain); it can be electrical as discussed in connection with FIG. 12; or it can be magnetic as discussed in connection with FIG. 11.

Two energy levels are degenerate if they have the same energy, i.e., the energy levels represented in FIG. 6B in the valleys 22 and 22' are degenerate. This condition applies in the case of multi-valley degeneracy. The "multi-valley degeneracy" is altered or lifted (as represented by FIG. 6C) if the group of symmetry operations leaving the solid invariant is altered by an applied stress, i.e. the previously existing equality of energy levels is removed. In the present invention, the equality of energy levels is removed by applying a symmetry-breaking stress which creates different-valued energy gaps (i.e. multi-gaps) as shown for example at 25 and 25' in FIG. 6C. Since the gaps 25 and 25' in FIG. 6C differ in value from one another, any radiation generated in the course of recombination at the gap 25 will differ in frequency from the frequency generated in recombination at the gap 25', and, as more particularly shown in FIGS. 10A–10D, each frequency has a number of modes.

"Occupation of energy level " is a well known term and refers to the quantum states or energy levels which must be used to describe the behavior of the electrons.

The terms symmetry-breaking strain, shear stress, multi-valley degeneracy, and occupation of energy levels are commonly used in discussions of piezoresistance. See, for example, "Piezoresistance Effect in p-Type PbTe" by J. R. Burke, Jr., Physical Review. Vol. 160, pages 636–648 (1967), the Ziman reference above mentioned, and R. W. Keyes, IBM Journal, Volume 5, pages 266–278 (1961).

The term "non-communicating character" used herein refers to the selection rules governing transitions between different valleys. If, overall, momentum and energy cannot be conserved in such a transition, the transition is forbidden and there is no "communication" between the different valleys, i.e. the valleys are non-communicating. A many-valley semiconductor is explained at page 440 of the Ziman reference, as before mentioned. Examples are PbTe, PbSe, PbS, as was previously discussed. Different-valued energy gaps can be all simultaneously pumped by the same device or each can be pumped separately with individual controls; thus, pumping can be effected by the means illustrated in FIGS. 2A, 2B and 2C alone or in some combination.

Modifications of the invention herein disclosed will occur to those skilled in the art and all such modifications are deemed to be within the spirit and scope of the invention as defined in the appended claims.

What is claimed is:

1. A method of providing a multiple-frequency laser beam, that comprises, establishing an inverted population in the occupation of the electronic levels in a multi-valley semiconductor forming at least part of an optical resonant cavity, the lattice temperature of the semiconductor being maintained at a value low enough to enable the semiconductor material to sustain at least two separate inverted electron populations, the electron energy level population associated with each valley being substantially independent of the energy level populations of the other valleys, and applying a stress to the semiconductor, the stress being one that lifts the multi-valley degeneracy thereby producing different-valued energy gaps within the material.

2. A method as claimed in claim 1 and in which the stress is varied in at least one of direction, magnitude and time to alter the extent to which the multi-valley degeneracy is lifted, thereby to change the frequency separation associated with the various valleys.

3. A method as claimed in claim 1 and in which the strain is a symmetry-breaking stress.

4. A method as claimed in claim 1 and in which the population inversion is achieved by operating the semiconductor as a diode, the optical cavity being located in the vicinity of the junction region of the diode.

5. A method as claimed in claim 1 and in which the electron population inversion is effected by optical pumping.

6. A method as claimed in claim 5 and in which the semiconductor is axially optically pumped and the laser beam is emitted in a direction orthogonal to the direction of pumping.

7. A method as claimed in claim 1 and in which the electron population inversion is effected by passing an electron beam through the optical resonant cavity, energy being extracted from the beam to create negative electron temperature within the semiconductor.

8. A method as claimed in claim 1 and in which the stress applied is a shear stress.

9. A method as claimed in claim 8 and in which the stress is changed in time to effect frequency modulation of the laser beam.

10. A method as claimed in claim 1 and in which the frequencies of the multiple-frequency laser beam are mixed emission. These are very high momentum phonons which cannot die directly by a radiative process. Furthermore, it is estimated that they would have a cavity lifetime of the order of $\omega t_p = 100$ or about $10^{-10}$ sec. Since the spontaneous intervalley scattering time is estimated to be of the order of $10^{-11}$ seconds, indicating a much stronger electron-phonon coupling than the electron-photon coupling, it would appear that all of the conditions required for the stimulated emission of intervalley phonons are satisfied.

The chip 90 in FIG. 9 is optically pumped P-type PbSe device subjected to a (1,1,0) stress, i.e. a stress along the (1,1,0) axis, as above discussed. As can be seen from FIG. 13, a stress oriented along the (1,1,0) axis alters the energy of the (1,1,1) and (1,$\bar{1}$,$\bar{1}$) ellipsoids differently than the (1,1,$\bar{1}$) and (1,$\bar{1}$,1) ellipsoids since the (1,1,0) stress axis lies in the (1,1,0) plane containing the major axes of the first pair of valleys i.e. the IN valleys, but is perpendicular to the plane containing the major axes of the second pair, i.e. OUT valleys. FIG. 14 shows the effect of a (1,1,0) stress on the IN and OUT valleys of P-type PbSe. On the left side of the figure the situation with no applied stress is shown indicating a common energy gap of 0.165 ev. or 7.5 microns for both IN and OUT valleys. On the right side of FIG. 13 the splitting of the multi-valley degeneracy is shown. The IN valence and conduction bands rise and the corresponding gap decreases while the OUT valence and conduction extrema fall with the gap increasing. A uniaxial stress of 310 bars stress splits the conduction band valleys by $4.135 \times 10^{-3}$ ev or $10^{12}$ Hz, which is sufficient for an intervalley phonon to be emitted.

The quasi-fermi level for holes lies below the top of the valence band by approximately 0.020 ev for P-type material with $10^{18}$ holes/cm³. Since the laser emission is from conduction band minimum to valence band maximum, the higher gap radiation emitted between the OUT valleys does not have sufficient energy to excite an electron from the IN valley quasi-fermi level in the valence band across the lower gap to the conduction band. Because of the frequency dependence of the dielectric constant, the mode frequencies associated with the IN gap will be slightly different from those associated with the OUT gap, this difference being pressure dependent. Consequently, the ability of radiation from an IN gap transition to stimulate an OUT gap transition and vice versa will also depend on pressure. It is possible to achieve a situation at pressures below those inducing intervalley transitions where the stressed cavity behaves as two individual lasers, as is discussed in detail in previous paragraphs. The beat frequency between modes of the IN and OUT gaps is stress dependent and tunable over a considerable range. If the stress is amplitude modulated, as mentioned previously, it will produce frequency modulation of the laser. It is possible to mix the IN and OUT valley radiation and obtain modulating signal directly without the requirement of a local oscillator.

In a situation in which the IN-OUT conduction band valley splitting is equal to or greater than the energy of the intervalley phonon, as represented by the situation now explained in connection with FIG. 15, an electron at the top of the distribution of an IN valley at $k_i$ can make a transition to an empty state $k_f$ in an OUT valley. The phonon spectrum is shown with increasing phonon energy directed opposite to the direction of increasing electron energy since, at this juncture, the concern is with phonon emission. By taking the zero of the phonon momentum at the initial electron momentum $k_i$, the nature of the intersection at $k_f - k_i$ of the phonon dispersion curve with the electron energy at $k_f$ for the OUT valley specifies which phonon if any can participate in an intervalley process. For phonon absorption processes the phonon energy axis is simply reserved and place the zero of momentum at $k_f$ in the OUT valley.

Several interesting features can be seen at once from FIG. 15. Intervalley phonon emission processes are impossible unless the IN-OUT energy splitting is at least equal to the (2,0,0) TA phonon. Intervalley phonon absorption processes are always possible, on the other hand, unless the IN-OUT splitting exceeds the (2,0,0) LO phonon. Furthermore, if the energy gap is decreased, as for example, by alloying PbSe with SnSe, lasing would be very unlikely if the gap became equal or smaller than the width of the phonon spectrum since excited electrons in one valley could make transitions to a hole state in the valence band at the same value of $k$ or to another valley and emit a phonon. The relatively strong electron-phonon coupling would make the loss of excited electrons by this process a rather effective bar to the establishment of a threshold inverted population for lasing. On the other hand, this is a very effective means of generating very high frequency phonons without the necessity of applying any stress. Another feature of FIG. 15 is that the intervalley transitions are unlikely to involve exactly (2,0,0) phonons since the electron states right at the band edge are occupied and not available as final scattering states.

Finally, FIG. 15 shows the possibility of having a phonon laser. Suppose that thermalization within a valley is very fast compared to intervalley processes. Then there will always be an inverted population between the initial filled state in the IN valley and the empty state in the OUT valley to which an electron scatters with the emission of a phonon. As previously discussed, the phonon cavity lifetime in this situation is of the order of $10^{-10}$ seconds, and the electron-phonon coupling, as indicated by a spontaneous intervalley scattering time of the order of $10^{-11}$ seconds, renders the situation extremely favorable for the stimulated emission of intervalley phonons.

Figure 8:
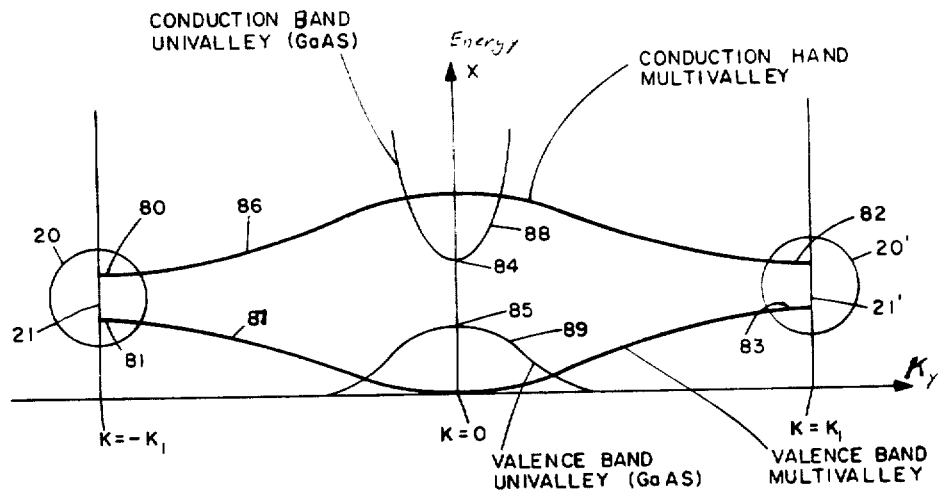
FIG. 8 is a two-dimensional diagramatic representation similar to that shown in FIG. 6A for a multi-valley semiconductor but including, also, energy-momentum curves for a uni-valley semiconductor.

This paragraph and several of the following paragraphs are devoted to defining some of the terms used in the specification with greater specificity. The term multi-valley (or many valley), used herein to describe energy band structure, is well known. A detailed explanation may be found in Chapter 2, pages 33-37 of "Semiconductors" by R. A. Smith, Cambridge University Press, Cambridge (1959). See also a book entitled "Electrons and Phonons, the Theory of Transport Phenomena in Solids," by J. M. Ziman, Oxford University Press, at page 440. The term is used in the situation wherein the maxima or minima of an energy band do not occur at $k=0$, the center of the Brillouin zone. Let the energy E at a point $k$ in band n be denoted by $\epsilon_n(k)$. This energy must equal $\epsilon_n(k')$ where $k'$ is any point in reciprocal space reached by applying a symmetry operation R belonging to the group G of symmetry operations that leaves the crystal invariant. Consequently, a conduction band minimum at a point $k$ away from $k=0$ must also occur at any point $k'$ related to $k$ by a symmetry operation which leaves the crystal invariant. Similarly, a valence band maximum at some point $k'$ away from $k=0$ must also be present at any point $k''$ related to $k'$ by a symmetry operation which leaves the crystal invariant. The curves designated 86 and 87 in FIG. 8 are the same energy-momentum curves as shown in FIG. 6A and represent respectively the conduction band and valence band of a multivalley semiconductor device (such as PbTe, PbSe or PbS) adapted to lase and in which lasing occurs due to transitions between minima 80 and 82 in the conduction band and maxima 81 and 83 in the valence band; the minima and maxima occur at the (1,1,1) edges of the Brilluoin zone designated $k=k_1$ and $k=-k_1$ in FIG. 8. In order to point out quite clearly the difference between a multivalley semi-conductor and single or uni-valley semiconductor, there is shown in FIG. 8, also, energy-momentum curves for a uni-valley semiconductor (as, for example, GaAs, ZnS, InSb, InAs), the curve numbered 88 representing the conduction band of such uni-valley device and the curve numbered 89 representing the valence band. The minimum point in the conduction band 88 is numbered 84 and the maximum in the valence band is numbered 85. (There are also the familiar cases of Ge and Si in which the maximum of the valence band occurs at $k=0$, which is called herein a single or uni-valley valence band, while the lowest points of the valence band occur away from $k=0$, respectively, at the (1,1,1) edge and along the (1,0,0) axes. The conduction bands are, therefore, multivalley. Since these are indirect gap materials, they do not act as lasers.) A stress similar to the stress discussed herein applied to a uni-valley within the semiconductor to produce sum and difference and other combination frequencies in the laser output of the frequencies associated with the different energy gaps produced by the stress.

11. Apparatus for providing a multiple-frequency laser beam, that comprises, a multi-valley semiconductor forming at least part of an optical resonant cavity, means for establishing an inverted population in the occupation of the energy levels of the semiconductor, means for maintaining the lattice temperature of the semiconductor at a value low enough to enable the semiconductor material to sustain at least two separate inverted electron populations, the electron energy level population associated with each valley being substantially independent of the energy level populations of the other valleys, means for applying a stress to the semiconductor, the stress being one that lifts the multi-valley degeneracy thereby producing different-valued energy gaps within the semiconductor material.

12. Apparatus as claimed in claim 11 and in which the optical resonant cavity is wholly within the semiconductor and has reflective faces that are parallel and planar to provide reflection surfaces to enable establishment of the laser beam.

13. Apparatus as claimed in claim 12 and in which the semiconductor is selected from the semiconductor group consisting of lead telluride, lead sulphide and lead selenide.

14. Apparatus as claimed in claim 12 and in which external mirrors at least form part of the optical resonant cavity.

15. Apparatus as claimed in claim 11 and in which means is provided external of the semiconductor for receiving the multiple-frequency beam and mixing the frequencies to provide sum and difference outputs.

16. Apparatus as claimed in claim 11 in which means is provided for modulating one of the frequencies, the multiple-frequency laser beam being transmitted to some remote region, means being provided at the remote region to receive the beam and to mix the modulated frequency with an unmodulated frequency thereby to create sum and difference signals.

17. Apparatus as claimed in claim 16 and in which demodulating means is provided to remove the modulating signal from the sum and difference signals.

18. Apparatus for providing a double-frequency laser beam that comprises in combination, a multi-valley semiconductor having an optical cavity, means for establishing an inverted population in the occupation of the energy levels of the semiconductor, means for maintaining the lattice temperature of the semiconductor at the value low enough to enable the semiconductor material to sustain two separate non-communicating inverted populations so that the energy level population associated with each valley is entirely independent of the energy level population of the other valley, and means for applying a stress to the semiconductor, the stress being one that lifts the multi-valley degeneracy thereby producing different-valued energy gaps within the material, means being provided to bias the semiconductor material periodically to remove the non-communicating character of the inverted populations thereby to create an optical flip-flop.

19. Apparatus as claimed in claim 18 and in which the bias means comprises means for applying a symmetry stress sufficient to remove the non-communicating character of said semiconductor.

20. Apparatus as claimed in claim 18 and in which the bias means comprises means for applying a strong electric field to the semiconductor.

21. Apparatus for providing a multiple-frequency laser beam, that comprises, a multi-valley semiconductor forming at least part of an optical resonant cavity, the semiconductor being adapted to receive energy to establish an inverted population in the occupation of the energy levels therein, the electron energy level population associated with each valley being substantially independent of the energy level populations of the other valleys, and means for applying a symmetry-breaking stress to the semiconductor, the stress being one that lifts the multi-valley degeneracy and produces different-valued energy gaps within the semiconductor material.

22. A method of generating multiple-frequency laser radiation in the active part of a multi-valley semiconductor laser, that comprises, establishing an inverted population in the occupation of the energy levels in the valleys in the active part of the semiconductor so that electromagnetic radiation therein is amplified by the process of stimulated emission, the energy level population associated with each valley being maintained substantially independent of the energy level population of the other valleys, and applying a symmetry-breaking stress to the semiconductor, said symmetry-breaking stress being adapted to lift the multi-valley degeneracy and provide different-valued energy gaps within said active part, the radiation thereby generated containing laser frequencies which differ from one another in accordance with amount of symmetry-breaking stress thereby applied.

23. A method as claimed in claim 22 that comprises increasing the symmetry-breaking stress sufficiently so that the energy separation of the stress split conduction and/or valence band valleys will be large enough so that carriers can transfer from a high lying valley to a lower lying valley by emission of phonons with conservation of energy and momentum, the frequency of said phonons being determined by the stress.

24. A method as claimed in claim 23 in which the symmetry-breaking stress is amplitude modulated to effect creation and termination of said phonons and/or to frequency modulate said phonons.

25. A method as claimed in claim 22 that comprises varying said stress in at least one of direction, magnitude and time thereby to modulate the energy gaps provided in said active part and thereby vary the difference frequency between the multiple frequencies produced in said active part.

26. A method as claimed in claim 22 in which the applied symmetry-breaking stress is either mechanical, electrical or magnetic or a combination thereof.

27. A method as claimed in claim 22 that includes the further step of varying said symmetry-breaking stress with time to effect frequency modulation of said radiation, the wavelength of the modulating signal being long enough to subject substantially the whole active lasing region, at the same instant of time, to either compression or rarefaction by virtue of said varying stress.

28. A method as claimed in claim 22 that includes the further step of varying the stress upon the semiconductor with time to effect frequency modulation of said radiation, the changes in stress to effect such modulation being small compared to the symmetry-breaking stress applied to lift the multi-valley degeneracy.

* * * * *